United States Patent
Middleton

[15] 3,687,904
[45] Aug. 29, 1972

[54] POLYAMIDES

[72] Inventor: Ronald David Middleton, Pontypool, England

[73] Assignee: Imperial Chemical Industries Limited, 3, Millbank, England

[22] Filed: Dec. 4, 1970

[21] Appl. No.: 95,327

Related U.S. Application Data

[63] Continuation of Ser. No. 726,219, May 2, 1968, abandoned.

[52] U.S. Cl. ............... 260/78 R, 8/178 R, 57/140 R, 260/78 A, 260/78 L, 260/78 TF
[51] Int. Cl. ............................................ C08g 20/20
[58] Field of Search ................ 260/78 A, 78 L, 78 TF

[56] References Cited

UNITED STATES PATENTS

| | | | |
|---|---|---|---|
| 2,863,857 | 12/1958 | Costain et al. | 260/78 TF |
| 2,989,798 | 6/1961 | Bannerman | 260/78 SC |
| 3,304,289 | 2/1967 | Ballentine et al. | 260/78 TF |
| 3,437,641 | 4/1969 | Lenz et al. | 260/78 L |

OTHER PUBLICATIONS

Man Made Fibers, Mark et al., Vol. 2, 1968, p. 218.
Synthetic Hetero– chain Polyamides, Korshak et al., 1964, pp. 87– 89.

*Primary Examiner*—Harold D. Anderson
*Attorney*—Leonard Horn and Stephen D. Murphy

[57] ABSTRACT

Deep dye polyamides prepared from thermally stable polymers, e.g., 6 or 6.8 nylon, using excess base stabilizer in the presence of a chain branching agent.

5 Claims, No Drawings

POLYAMIDES

The present invention, which is a continuation of application Ser. No. 726,219, filed May 2, 1968, now abandoned, relates to modified polyamides and is especially concerned with the modification of polyamides having a gel time in excess of 1,500 minutes to yield polymers which may be melt spun into filaments having enhanced affinity for anionic dyestuffs.

The requirement for modified polyamide yarns which have deep dye or ultra deep dye characteristics, that is yarns which will take up relatively large amounts of anionic dyestuffs and hence dye to a deeper shade than yarns spun from standard polymer, has long been recognized and considerable work involving the use of additives, or the preparation of copolymers containing a major proportion of the unmodified polyamide, has been undertaken in order to achieve this result.

One technique is to produce a modified polymer having a large number of amine end groups available which will substantially increase the affinity of the fibers produced therefrom for anionic dyestuffs. The availability of amine end groups may be achieved by the use of an excess of base during the polymerization of polyamide, however, such polyamides have only low melt and relative viscosities and consequently have poor spinning performance. The minimum melt viscosity for melt spinning is considered to be 400 poises at 25° C above the optical melting point of the polymer.

It is also known that the melt and relative viscosity of a polyamide may be raised by the incorporation of a branching agent during the polymerization process.

Attempts to produce a deep dye polyamide yarn from polyhexamethylene adipamide produced by the polymerization of hexamethylene diammonium adipate in the presence of an excess of base and with the addition of sufficient branching agent to effect a significant increase in melt viscosity of the polymer have been unsuccessful since polymers produced in this way rapidly gel and melt spinning is impracticable.

We have now found that the modified polyamide yarn having enhanced affinity for anionic dyestuffs may be obtained by melt spinning polymer prepared by the polymerization of a lactam, an alpha-omega-amino acid or a salt of a diamine and di-carboxylic acid or functional equivalents thereof and having a gel time in excess of 1,500 minutes in the unmodified condition in the presence of excess base and a chain branching agent.

Accordingly, therefore, the present invention provides a modified polyamide having a melt viscosity of at least 400 poises at a temperature of 25° C above the optical melting point of the polymer, derived from a lactam, an alpha-omega-amino carboxylic acid or the salt of a diamine and di-carboxylic acid or functional equivalents thereof polymerized in the presence of excess base and a chain branching agent, the polymerization of the lactam, alpha-omega-amino carboxylic acid or salt yielding an unmodified polyamide having the gel time of at least 1,500 minutes.

Suitable polyamides include:
polyepsilon caprolactam
polyhexamethylene suberamide
polyhexamethylene sebacamide
polyaminoundecanoic acid.

Copolymers of polyhexamethylene adipamide and polyepsilon caprolactam in the proportions 75/25 to 25/75 parts by weight are also suitable.

As chain branching agents there may be mentioned bis-hexamethylene triamine and timesic acid.

By the term "excess base" we mean the amount of base added in excess of that required to be equivalent to the number of carboxyl groups present for polymerization, the excess being sufficient, after allowing for any loss of base during polymerization, to give an excess of basic over acidic end groups high enough to yield a polymer which can be spun into filaments exhibiting deep-dye characteristics.

The amount of chain branching agent required is determined empirically and is the amount necessary to raise the melt viscosity, and therefore also the relative viscosity, of the polyamide, polymerized in the presence of excess base, to a level suitable for commercial melt spinning. Thus the melt viscosity should be at least 400 poises measured at 25° C above the optical melting point of the polymer.

Generally the concentration of chain branching agent should be in the range 20–150 moles per $10^6$ grams of salt or lactam, preferably 60–100 moles per $10^6$ grams of salt or lactam.

The excess base and chain branching agent may be one and the same substance, for example bis-hexamethylene triamine. However, in this instance, if a sufficient quantity of the chain branching agent/base is added to provide an adequate number of branch points to effect a useful increase in melt viscosity, then the number of basic groups also added will result in the polymer having a reduced molecular weight owing to the reversal of the polyamidation. The addition of a small amount of a dibasic acid to counteract the presence of the very large number of basic groups effectively raises the melt viscosity to the required level whilst leaving the excess of basic over acidic end groups sufficiently high for the polymer to have the desired dyeing characteristics.

In order that the modified polyamide should have the desired deep dyed characteristics the polymer should have an excess of basic over acidic end groups (A – C) of at least 80 and preferably between 150 and 200. The proportions of excess base, chain branching agent and di-acid (where required) should be arranged to meet this requirement but still provide a polymer as defined above.

The invention also provides a process for the manufacture of a modified polyamide having a melt viscosity of at least 400 poises measured at a temperature of 25° C above the optical melting point of the polymer, by the polymerization of a lactam, an alpha-omega amino carboxylic acid or the salt of a dicarboxylic acid or diamine or functional equivalent thereof which yield an unmodified polyamide having a gel time of at least 1,500 minutes, wherein the polymerization is carried out in the presence of excess base and a chain branching agent.

The gel time of a polymer is measured using a modified form of "Tecam" gelation timer made by Techne Limited of Cambridge. In the timer a rod of weight 20.5 g., diameter one-eighth inch and approximate length 13 inches, is connected by a link with end play in it to a crank turned by a synchronous motor.

The rod falls under gravity into a cylindrical aluminum tube of ¾-inch internal diameter, and is so positioned that it reaches to within one-half inch of the base of the cylinder on completion of the down stroke. The rod is pulled up on the up stroke by the synchronous motor. A sample of polymer, weight 10.5 g. is contained in the cylindrical tube maintained at 25° C above the optical melting point of the polymer by a suitable heating device and a current of steam passed over the surface of the polymer to prevent oxidation. At gel point the rigidity of the polymer is sufficient to support the weight of the rod and this causes an electric circuit to be closed which switches off a timing mechanism thus recording the gel time.

The melt viscosity of a polymer is determined using a melt viscometer comprising a stainless steel tube of approximately 10 cm. length and 1 cm. internal diameter. This tube is closed at one end by the insertion of a spinneret containing in the center a circular orifice of known length and radius. The melt viscosity is then determined by placing about 2 grams of the polymer in the tube and inserting a small stainless steel ball having a diameter slightly less than the internal diameter of the tube on top of the polymer. Nitrogen is blown through the tube to expel oxygen and the tube placed inside a heater maintained at the temperature required for the determination. The tube is allowed to remain in the heater for 15 minutes to ensure complete melting of the polymer after which nitrogen, at 100 p.s.i.g. is supplied to the top of the tube to force polymer through the orifice. After a uniform flow of polymer has been established the threadline is cut and the weight of polymer extruded in a finite time determined. The melt viscosity is calculated from the Poiseuille equation appearing at page 220 of General Properties of Matter by Newman and Searle.

The present invention further includes filaments and fibers spun from the above-mentioned polymer, preferably by melt spinning techniques, which filaments dye to a deeper shade than filaments spun from unmodified polymer when using acid dyestuffs.

Yarns containing filaments as defined above may be crimped, for example by the well-known stuffer box technique, and are especially useful in pile fabrics, such as carpets, when used together with a standard yarn to give two-tone color effects.

The following examples illustrate but do not limit the invention.

EXAMPLE 1

Six thousand g. of hexamethylene diammonium suberate, 48 g. of hexamethylene diamine and 33.4 g. of bis-hexamethylene triamine were placed together in an autoclave and polymerization effected in the usual manner. The resultant polyhexamethylene suberamide (6.8 nylon) had the following properties:

| | |
|---|---|
| Relative viscosity | 29 |
| Melt viscosity at °C | 465 poise |
| Amine end group content g/$10^6$ g. (A) | 183 |
| Carboxyl end group content g/$10^6$ g. (C) | 20 |
| A − C | 163 |
| Gel time | 1500 mins. |
| Gel time for unmodified 6.8 nylon | > 6000 mins. |

The polymer was melt spun into filaments which were drawn to orient them using standard equipment. The resultant yarn had much improved affinity for acid dyestuffs.

The effect of the chain branching agent in increasing the A − C value for a given value of relative viscosity or of increasing the relative viscosity for a given value of A − C may be illustrated as follows using polyhexamethylene suberamide as a model:

The relationship between R.V. and total end group (T.E.G.) content, i.e., the sum total of end groups as determined by titration, for 6.8 nylon in the R.V. range 16–45, may be expressed according to the following formula:

$$\log_{10} \text{R.V.} = 5.190 - 1.683 \log_{10} \text{T.E.G.}$$

Thus for a polymer of R.V. 29 the total end group value should be 164.

The equilibrium constant for this polymerization is such that under 1 atmosphere of steam at 290° C the product A × C is equal to 2,440.

Thus $$A \times C = 2,440$$

$$A + C = 164$$

Solution of these equations shows that A = 147.5, C = 16.5 and therefore that A − C = 131. This figure is significantly lower than the value of 163 obtained in the Example.

The R.V. of the polymer having A − C=163 obtained using excess base stabilizer only can also be calculated. In this case the equations would be:

$$A - C = 163$$

$$A \times C = 2,440$$

Solution of these equations shows that A − 177 and C − 14, T.E.G. is thus 191 and the above-mentioned empirical relationship shows this to correspond to an R.V. of only 22.5, which is too low for melt spinning processes.

The relative viscosity (R.V.) referred to above is the viscosity of an 8.4 percent w/w solution of polymer in 90 percent aqueous formic acid relative to the viscosity of the formic acid.

EXAMPLES 2 TO 6

Samples of polyepsilon caprolactam containing varying concentrations of bis-hexamethylene triamine (HMT) and sebasic acid were prepared by Carius tube polymerizations. Reactants were heated, together with 15 percent of water as a polymerization catalyst, in a sealed Carius tube for 2½ hours at 260° C and a further 1½ hours at 280° C under an atmosphere of steam and atmospheric pressure. Details of the additive concentrations and polymer properties are given in Table 1.

TABLE 1.

| Polymer Ex. | Additives (moles/$10^6$ g salt) bis HMT | Additives Sebacic acid | R.V. | A.E.G. g/$10^6$g | C.E.G. g/$10^6$g | A-C | Melt viscosity poise | temp. for M.V. measurement |
|---|---|---|---|---|---|---|---|---|
| Control 6 nylon | nil | nil | 39.4 | 60 | 60 | nil | 4040 | 240 |
| 2 | 44 | nil | 19.8 | 182 | 32 | 150 | 356 | " |

| | | | | | | | | |
|---|---|---|---|---|---|---|---|---|
| 3 | 22 | nil | 30.9 | 121 | 39 | 82 | 1600 | " |
| 4 | 89 | 89 | 181.0 | 147 | 34 | 113 | 4000 | " |
| 5 | 89 | 44 | 27.9 | 220 | 24 | 196 | 625 | " |
| 6 | 89 | 22 | 24.1 | 242 | 22 | 220 | >400 | " |

To obtain a suitable melt viscosity for melt spinning, when using HMT as the excess base and the chain branching agent, the concentration of HMT had to be reduced to 22 moles per $10^6$ grams of polyepsilon caprolactam at which point the excess of amine end groups over acid end groups (A − C) value was only just sufficient to impart a deep dye characteristic to the polymer. The addition of sebacic acid enabled increased amounts of HMT to be added to give the preferred A − C value and a melt viscosity adequate for melt spinning.

Yarn spun from the polymers having A − C values above 80 all showed deep dyeing characteristics when dyed with acid dyestuffs.

EXAMPLES 8 TO 10

Samples of hexamethylene sebacamide and polyamino-undecanoic acid were prepared by Carius tube polymerizations in which the reactants were heated in a sealed tube for 3 hours at 220° C and then for a further 1½ hours at atmospheric pressure under an atmosphere of steam at 280° C. Details of the additive concentrations and polymer properties are given in Table 2.

TABLE 2

| | Additives (moles/$10^6$ g salt) | | | Polymer Properties | | | | Temp. for M.V. measurement |
|---|---|---|---|---|---|---|---|---|
| Polymer Ex. | bis HMT | sebacic acid | | A.E.G. g/$10^6$g | C.E.G. g/$10^6$g | A–C | Melt Viscosity poise | |
| Control 6.10 nylon | nil | nil | | 79 | 35 | 44 | 2250 | 250 |
| 8 | 89 | 44 | | 220 | 22 | 198 | 3990 | " |
| 7 | 60 | nil | | 229 | 16 | 213 | 677 | " |
| Control 11 nylon | nil | nil | | 50 | 37 | 13 | >400 | — |
| 10 | 89 | 44 | | 206 | 21 | 185 | 866 | 270 |
| 9 | 60 | nil | | 213 | 12 | 201 | 603 | 220 |

The addition of sebacic acid seen to be desirable to give polymers having a desired high amine A − C and adequate melt viscosities, although the addition of the sebacic acid is clearly not essential. Yarns spun from the polymers containing HMT all show deep dyeing characteristics.

EXAMPLES 11 to 13

Copolymers of polyepsilon caprolactam and polyhexamethylene adipamide in proportions 75/25 and 25/75 parts by weight were prepared by Carius tube polymerizations in the manner described in Examples 2-6 omitting the addition of water. Concentration of additives and polymer properties are given in Table 3.

TABLE 3

| | Additives (moles/$10^6$ g/ salt) | | Polymer Properties | | | | Temp. for M.V. measurement |
|---|---|---|---|---|---|---|---|
| Polymer Ex. | bis HMT | Sebacic acid | A.E.G. g/$10^6$g | C.E.G. g/$10^6$g | A–C | Viscosity poise | |
| Control 75/25 66, 6 | nil | nil | 59 | 47 | 22 | — | — |
| 11 | 89 | 44 | 216 | 25 | 191 | 900 | 270 |
| Control 25/75 66, 6 | nil | nil | 61 | 56 | 5 | 1650 | 250 |
| 12 | 60 | nil | 190 | 24 | 166 | 2865 | " |
| 13 | 89 | 44 | 191 | 28 | 163 | >400 | " |

Although polyhexamethylene adipamide containing HMT and an excess base cannot be successfully melt spun because of the tendency of the polymer to gel, the addition of as little as 25 percent polyepsilon caprolactam permits melt spinning. Yarns spun from the polymers containing HMT all have deep dyeing characteristics.

EXAMPLE 14

Caprolactam and hexamethylene diammonium adipate, in proportions to yield a 50:50 weight for weight copolymer, together with bis-hexamethylene triamine, sebacic and water were polymerized in an autoclave according to the normal procedure for 6.6 nylon. The additive concentrations and polymer properties are shown in Table 4.

TABLE 4

| | Additives (moles/$10^6$ g salt) | | | Polymer properties | | | | Temp. for M.U. measurement |
|---|---|---|---|---|---|---|---|---|
| Polymer Ex. | bis HMT | Sebacic acid | R.U. | A.E.G. g/$10^6$g | C.E.G. g/$10^6$g | A–C | Melt Viscosity poise | |
| 14 | 89 | 44 | 50/50 6. 66 | 45.4 | 206 | 19 | 187 | 1150 270 |

EXAMPLE 15

Amino undecanoic acid and bis-hexamethylene triamine together with sebacic acid were polymerized in an autoclave according to the procedure described in Example 14. Details of the additive concentrations and polymer properties are given in Table 5.

TABLE 5

| | Additives (moles/$10^6$ g salt) | | | Polymer Properties | | | | Temp. for M.V. measurement |
|---|---|---|---|---|---|---|---|---|
| Polymer Ex. | bis HM acid | Sebacic acid | R.U. | A.E.G. g/$10^6$g | C.F.G. g/$10^6$g | A–C | Melt Viscosity poise | |
| 15 | 89 | 44 | 11 nylon | — | 219 | 10 | 209 | 700 220 |

Although the above examples all relate to the use of a chain branching agent which is itself a base, notably bis-hexamethylene triamine, it is also permissible to employ chain branching agents which are acidic in nature. Clearly when using such chain branching agents, it may be necessary to add larger excesses of base to counteract the presence of the acid.

EXAMPLE 6

Caprolactam, trimesic acid and hexamethylene diamine were placed in a sealed Carius tube and heated at 260° C for 21 hours. At the end of this time the tube was opened and the contents heated under steam under atmospheric pressure at 280° C for a further 1½ hours. Details of the additive concentrations and polymer properties are given in Table 6.

TABLE 6

| Ex. | Polymer | Additives (moles/10⁶ g salt) | | R.U. | Polymer properties | | | Melt Viscosity poise | Temp. for M.U. measurement |
| --- | --- | --- | --- | --- | --- | --- | --- | --- | --- |
| | | Trimesic acid | Hexamethylene diamine | | A.E.G. g/10⁶g | C.F.G. g/10⁶g | A–C | | |
| 16 | 6 | 44 | 155 | 22.7 | 24.3 | 27 | 216 | 722 | 240 |

Yarns spun from this polymer exhibited deep-dye characteristics when dyed with acid dyestuffs.

Having thus disclosed the invention, what is claimed is:

1. A modified, fiber formable, deep dyeable, melt spinnable aliphatic polyamide, having a melt viscosity of at least 400 poises at 25° centigrade above the optical melting point of the polymer, said polyamide consisting essentially of the polymeric condensation product, of a composition of (A) a monomer selected from the group consisting of a lactam, an alpha-omega aminocarboxylic acid, the salt of a diamine and an organic dicarboxylic acid and mixtures thereof, (B) excess bis-hexamethylene triamine and (C) 20–150 moles per 10⁶ grams of (A) of a chain-branching agent selected from the class consisting of bis-hexamethylene triamine and trimesic acid, the unmodified polyamide having a gel time of at least 1,500 minutes, said modified polyamide having an excess of at least 80 amino over carboxyl end groups.

2. Polyamide according to claim 1 wherein the chain-branching agent is bis-hexamethylene triamine and sebacic acid is included in the polymerization system in amounts sufficient to increase the melt viscosity of the modified polyamide.

3. The modified polyamide according to claim 1 wherein said polymer is selected from the group consisting of poly-epsilon-caprolactam, polyhexamethylene suberamide, polyhexamethylene sebacamide, and polyamino-undecanoic acid.

4. A modified polyamide according to claim 1 wherein the polymer is selected from the class consisting of co-polymers of hexamethylene diammonium adipate and epsilon-caprolactam in proportions of 75/25 to 25/75 parts by weight.

5. Filament or fiber of the polyamide of claim 1.

* * * * *